United States Patent
Luo et al.

(10) Patent No.: US 10,216,711 B2
(45) Date of Patent: Feb. 26, 2019

(54) INFORMATION COLLECTION METHOD AND APPARATUS

(71) Applicant: Xiaomi Inc., Beijing (CN)

(72) Inventors: Jixi Luo, Beijing (CN); Jinbin Lin, Beijing (CN); Ming Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/085,607

(22) Filed: Mar. 30, 2016

(65) Prior Publication Data

US 2017/0075868 A1    Mar. 16, 2017

(30) Foreign Application Priority Data

Sep. 15, 2015   (CN) .......................... 2015 1 0587719

(51) Int. Cl.
*G06F 17/22* (2006.01)
*G06F 3/048* (2013.01)
(Continued)

(52) U.S. Cl.
CPC ............ *G06F 17/2235* (2013.01); *G06F 3/16* (2013.01); *H04L 51/046* (2013.01); *H04L 12/1813* (2013.01)

(58) Field of Classification Search
CPC ... H04L 51/04; G06F 17/243; G06F 17/30522
See application file for complete search history.

(56) References Cited

U.S. PATENT DOCUMENTS

| 8,095,665 | B1 * | 1/2012 | Bau | ...................... | G06Q 10/103 709/227 |
| 8,473,553 | B2 * | 6/2013 | McDevitt | ............. | G06Q 10/107 709/206 |

(Continued)

FOREIGN PATENT DOCUMENTS

| CN | 1735078 A | 2/2006 |
| CN | 1992683 A | 7/2007 |

(Continued)

OTHER PUBLICATIONS

Fossbytes.com, "Facebook Launches Messenger.com", Apr. 9, 2015, pp. 1-6 https://fossbytes.com/facebook-messenger-for-web-browsers-dedicated/.*
Lehigh University: Qualtrics Survey, Jan. 6, 2015, pp. 1-5 https://web.archive.org/web/20150106173408/http://lts.lehigh.edu:80/services/stepwise-instructions/qualtrics-survey-upload-file-feature.*
Telegram.org, Shared Files and Fast Mute, Feb. 1, 2015, pp. 1-5 https://telegram.org/blog/shared-files.*

(Continued)

*Primary Examiner* — Scott T Baderman
*Assistant Examiner* — Mario M Velez-Lopez
(74) *Attorney, Agent, or Firm* — Oblon, McClelland, Maier & Neustadt, L.L.P.

(57) ABSTRACT

The present disclosure provides an information collection method. Aspects of the disclosure provide a method for collecting information. The method includes receiving, at a terminal device having a user account in a social group that is established by a communication service, a trigger message that is sent by a specific user account of the social group to members of the social group. The trigger message includes a prompt text and a jump instruction to a page for collecting specific information. Further, the method includes generating a text link associated with the jump instruction based on the prompt text, displaying the text link on an interface page for the communication service and executing the jump instruction to display the page for collecting the specific information when a trigger event with respect to the text link is detected.

20 Claims, 5 Drawing Sheets

(51) Int. Cl.
*H04L 12/58* (2006.01)
*G06F 3/16* (2006.01)
*H04L 12/18* (2006.01)

(56) References Cited

U.S. PATENT DOCUMENTS

| | | | |
|---|---|---|---|
| 8,875,011 B2* | 10/2014 | Sitrick | G06F 17/00 |
| | | | 715/230 |
| 9,424,549 B2* | 8/2016 | Jones | G06Q 10/10 |
| 9,495,559 B2* | 11/2016 | Le Chevalier | G06F 17/30014 |
| 9,509,642 B2* | 11/2016 | Wu | H04L 51/18 |
| 9,922,124 B2* | 3/2018 | Rathod | G06F 17/30867 |
| 2004/0249727 A1* | 12/2004 | Cook, Jr. | G06Q 10/10 |
| | | | 705/26.81 |
| 2006/0026256 A1* | 2/2006 | Diddee | H04L 51/04 |
| | | | 709/207 |
| 2008/0189620 A1 | 8/2008 | Bonforte et al. | |
| 2009/0186700 A1 | 7/2009 | Konkle | |
| 2011/0047485 A1* | 2/2011 | Takakura | G06F 21/6209 |
| | | | 715/753 |
| 2011/0078251 A1* | 3/2011 | Cross | H04L 51/04 |
| | | | 709/206 |
| 2013/0290532 A1 | 10/2013 | Richardson et al. | |
| 2014/0258821 A1 | 9/2014 | Kim | |
| 2015/0082212 A1 | 3/2015 | Sharda | |
| 2016/0021038 A1* | 1/2016 | Woo | H04L 51/046 |
| | | | 709/206 |

FOREIGN PATENT DOCUMENTS

| | | |
|---|---|---|
| CN | 104660580 A | 5/2015 |
| CN | 104703125 A | 6/2015 |
| EP | 1 624 613 A1 | 2/2006 |
| JP | 2002-056070 | 2/2002 |
| JP | 2005-267187 | 9/2005 |
| JP | 2015-036846 | 2/2015 |
| KR | 10-2014-0015799 | 2/2014 |
| KR | 10-2014-0110384 A | 9/2014 |
| KR | 10-2015-00082982 A | 1/2015 |
| RU | 2 542 937 C2 | 4/2014 |
| WO | 2008/067415 A2 | 6/2008 |
| WO | WO 2015/081720 A1 | 6/2015 |

OTHER PUBLICATIONS

International Search Report dated Jun. 27, 2016 in PCT/CN2015/099507 (with English translation of categories of cited documents).
Japanese Office Action dated Sep. 19, 2017 in Japanese Application No. 2017-539493 (3 pages).
Extended European Search Report dated Jan. 26, 2017, in European Patent Application No. 16170921.7.
Office Action dated Apr. 12, 2017, in Korean Patent Application No. 10-2016-7005213.
Office Action dated May 26, 2017 in Russian Patent Application No. 2016114450 (with English language translation).
English language translation of International Search Report dated Jun. 27, 2016 in PCT/CN2015/099507 (previously filed Sep. 2, 2016).
Notice of Allowance dated Oct. 12, 2017, in Korean Patent Application No. 10-2016-7005213 (with English language translation).
Office Action dated Mar. 5, 2018, in corresponding European Patent Application No. 16170921.7, citing document AO therein.
Office Action dated Feb. 5, 2018, in corresponding Chinese Patent Application No. 201510587719.4, citing document AP therein.

* cited by examiner

INFORMATION COLLECTION METHOD AND APPARATUS

This application is based upon and claims priority to Chinese Patent Application No. 201510587719.4, filed on Sep. 15, 2015, the entire contents of which are incorporated herein by reference.

TECHNICAL FIELD

The present disclosure relates to the field of communications, and more particularly, to an information collection method and apparatus.

BACKGROUND

During group chatting, generally, feedback information of group members needs to be quickly collected. For example, when initiating a group activity, a group manger needs to know as soon as possible feedbacks of all the group members with respect to the group activity. Therefore, how to quickly collect feedback information of the group members during group chatting is significant for improving group chat experience of users.

SUMMARY

The present disclosure provides an information collection method and apparatus.

Aspects of the disclosure provide a method for collecting information. The method includes receiving, at a terminal device having a user account in a social group that is established by a communication service, a trigger message that is sent by a specific user account of the social group to members of the social group. The trigger message includes a prompt text and a jump instruction to a page for collecting specific information. Further, the method includes generating a text link associated with the jump instruction based on the prompt text, displaying the text link on an interface page for the communication service and executing the jump instruction to display the page for collecting the specific information when a trigger event with respect to the text link is detected.

According to an aspect of the disclosure, the user account is the specific user account that initiates operations for collecting information. The method further includes displaying the page for collecting the specific information with a trigger option to initiate the operations for collecting information from the members of the social group, detecting that the trigger option is selected, and generating the trigger message to be sent to the members of the social group.

Further, in an example, the method includes displaying a first setting interface page when the selection of the trigger option is detected, receiving an input of the prompt text via the first setting interface page, generating the trigger message based on the received prompt text and the jump instruction to the page for collecting the specific information, and causing the trigger message to be sent to the members of the social group.

In another example, the method includes displaying a second setting interface page when the selection of the trigger option is detected. The second setting interface is used to receive the prompt text and a selection of the page from a plurality of pages. Then the method includes receiving an input of the prompt text via the second setting interface page, receiving the selection of the page from the plurality of pages via the second setting interface page, generating the jump instruction for jumping to the page, generating the trigger message based on the received prompt text and the generated jump instruction, and causing the trigger message to be sent to the members of the social group.

To display the text link on the interface page for the communication service, in an example, the method includes highlighting the text link on the interface page.

To execute the jump instruction to display the page for collecting the specific information when the trigger event with respect to the text link is detected, the method includes executing the jump instruction to display the page for collecting the specific information, receiving an input of the specific information via the page and uploading the received specific information to a server for providing the communication service for the server to collect the specific information.

According to an aspect of the disclosure, the page is at least one of a group album page for collecting picture information, a group sign-in page for collecting geographical location information, and a group activity page for collecting voice information and text information.

Aspects of the disclosure provide an apparatus for use in collecting information. The apparatus includes a processor and a memory for storing instructions executable by the processor. The processor is configured to receive, under a user account in a social group that is established by a communication service, a trigger message that is sent by a specific user account of the social group to members of the social group. The trigger message includes a prompt text and a jump instruction to a page for collecting specific information. Further, the processor is configured to generate a text link associated with the jump instruction based on the prompt text, cause the text link to be displayed on an interface page for the communication service, and execute the jump instruction to display the page for collecting the specific information when a trigger event with respect to the text link is detected.

Aspects of the disclosure provide a non-transitory computer-readable storage medium having stored therein instructions that, when executed by one or more processors of an apparatus, cause the apparatus to perform operations for collecting information. The operations include receiving, at the apparatus having a user account in a social group that is established by a communication service, a trigger message that is sent by a specific user account of the social group to members of the social group. The trigger message includes a prompt text and a jump instruction to a page for collecting specific information. Further, the operations include generating a text link associated with the jump instruction based on the prompt text, displaying the text link on an interface page for the communication service, and executing the jump instruction to display the page for collecting the specific information when a trigger event with respect to the text link is detected.

It shall be appreciated that the above general description and the detailed description hereinafter are only illustrative and interpretative, but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terminology used in the present disclosure is for the purpose of describing particular embodiments only and is not intended to limit the present disclosure. As used in the present disclosure and the appended claims, the singular forms "a", "an" and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first", "second", "third", etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to determining" depending on the context.

According to an information collection method provided by the present disclosure, a trigger message including a prompt text and a page jump instruction mass-sent by a preset group member is received; a corresponding text link is generated based on the prompt text, and the text link is displayed on the group chat interface; and the page jump instruction is executed to jump to a corresponding target page to complete collection of target information when a preset trigger event with respect to the text link is monitored. In this way, target information of the group members is quickly collected during group chatting, which is favorable to improving user's group chat experience.

Figure 1:
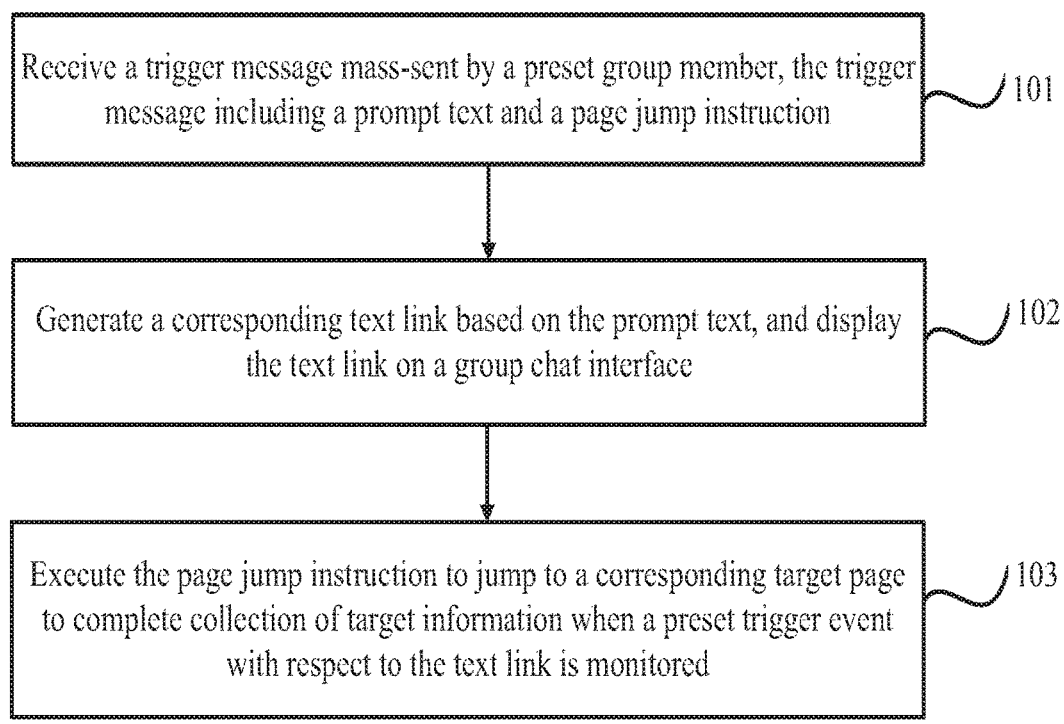
FIG. 1 is a schematic flowchart illustrating an information collection method according to an exemplary embodiment of the present disclosure.

FIG. 1 illustrates an information collection method according to an exemplary embodiment of the present disclosure. As illustrated in FIG. 1, the information collection method is applied in a terminal, and includes the following steps.

In step 101, a trigger message mass-sent by a preset group member is received, wherein the trigger message includes a prompt text and a page jump instruction.

In step 102, a corresponding text link is generated based on the prompt text, and the text link is displayed on a group chat interface.

In step 103, when a preset trigger event with respect to the text link is monitored, the page jump instruction is executed to jump to a corresponding target page to complete collection of target information.

The technical solutions disclosed in step 101 to step 103 may be understood as an information collection logic loaded in group chat client software (for example, an instant messaging APP) installed in the above terminal. The group chat client software may quickly collect target information of group members during group chatting by running the above information collection logic.

In this embodiment, the above terminal may be a mobile terminal of a user. For example, the mobile terminal may be a touch-screen smart phone of the user. The target page may include a group album page, a group sign-in page, and a group activity page; and the target information may include picture information, geographical location information, voice information, and text information. Nevertheless, during implementation, the above target page and target information may include other content besides the content mentioned in the above description.

When the user is engaged in a group chat by using client software (hereinafter referred to as APP) installed in the terminal, in addition to providing a group chat service for the user, the APP may generally provide value-added services. When the user uses the value-added services provided by the APP, the APP generally has a demand on quickly collecting the target information relevant to the value-added services, wherein the target information is generated in the course of using the value-added services by all the group members.

For example, in addition to providing the group chat service, the APP may provide such functions as a group album, a group sign-in, and a group activity for the user. When the user enables the group album function and has created a group album relevant to an offline activity, the APP generally has a demand on quickly collecting photos relevant to the offline activity. When the user enables the group sign-in function, the APP generally has a demand on quickly collecting the sign-in information such as geographical location information of all the group members. When the user enables the group activity function, the APP generally has a demand on quickly collecting text feedback information or voice feedback information of all the group members with respect to the initiated offline activity.

In the related art, when the APP collects the target information relevant to the value-added services that is generated in the course of using the value-added services by all the group members, collection of the target information is generally dependent on user's initiative uploading. As a result, the target information of all the group members may not be quickly collected.

In this embodiment, to more quickly collect the target information of all the group members, a trigger option may be preset in the target page, wherein the trigger option is configured to trigger mass-sending of the trigger message to all the group members.

When a preset group member is using the value-added services provided by the APP, by performing a preset trigger operation for the trigger option, the APP may be triggered to mass-send a trigger message to the other group members. The trigger message may include a prompt text and a page jump instruction. The prompt text may be prompt information input by the preset group member in a customization manner, and the page jump instruction may be an instruction defined by the APP system for jumping to a target page.

Meanwhile, when the preset group member is using the value-added services, the APP may monitor in real time a trigger event with respect to the trigger option, and judge whether the monitored trigger event is a preset trigger event corresponding to the preset trigger operation. If the monitored trigger event is the preset trigger event corresponding to the preset trigger operation, the APP may be triggered to mass-send the trigger message to the other group members.

It should be noted that, in practical application, the target page may be an independent page, or may include a plurality of subpages. For example, when the target page is a group sign-in page, the target page is generally an independent page; when the target page is a group album page, the target page may generally include a plurality of subalbums, and in this case, the target page may further include, in addition to the main page, a plurality of subpages corresponding to the plurality of subalbums respectively; and when the target page is a group activity page, the target page may generally include a plurality of activity subjects, and in this case, the target page may further include, in addition to the main page, a plurality of subpages corresponding to the plurality of activity subjects respectively.

Hereinafter, with respect to the above two circumstances, the process of mass-sending the trigger message by the APP to all the group members is described.

In an illustrated implementation manner, when the target page is an independent page, the trigger option may be preset in the independent page of the target page. When the APP has monitored the preset trigger event with respect to the trigger option, a first setting interface may be output to the preset group member. In this case, the preset group member may input a prompt text in the first setting interface.

When the prompt text is successfully input, the APP may acquire the prompt text input by the preset group member in the first setting interface, and then create the trigger message based on the acquired prompt text and a preset page jump instruction for jumping to the target page. When the trigger message is successfully created, the trigger message may be mass-sent to all the group members by using the group chat function of the APP. The preset trigger operation may be a click operation, and the preset trigger event may be a click event corresponding to the click operation.

In another illustrated implementation manner, when the target page includes a plurality of subpages, the trigger option may be respectively preset in the main page and the plurality of subpages of the target page. When the APP has monitored the preset trigger event with respect to the trigger option on the subpage, the first setting interface may still be output to the preset group member. The specific implementation is not described herein any further.

When the APP has monitored the preset trigger event with respect to the trigger option on the main page, a second setting interface may be output to the preset group member. In this case, the preset group member may input a prompt text in the second setting interface, and select a corresponding target subinterface in the second setting interface.

When the prompt text is successfully input, the APP may acquire the prompt text input by the preset group member in the second setting interface and the target subinterface selected in the second setting interface, generate a page jump instruction for jumping to the target subinterface at the background, and create the trigger message based on the acquired prompt text and the generated page jump instruction. When the trigger message is successfully created, the trigger message may be mass-sent to all the group members by using the group chat function of the APP.

The preset group member may be a group manager or a group member having equivalent rights. For example, when the target page is a group sign-in page, the preset group member may be a group manager; and when the target page is a group album page, the preset group member may be a group manager and creators of the subalbums in the group album page. When the target page is a group activity page, the preset group member may be a group manager and initiators of the activities on the group activity page.

In this embodiment, when the APP has mass-sent the trigger message, after the APP of each of all the group members receives the trigger message, a corresponding text link may be generated based on the prompt text in the trigger message, and then the generated text link is displayed on the group chat interface. Since there are masses of group chat messages on the group chat interface, the APP may highlight the text link on the group chat interface when displaying the text link. For example, the text link may be displayed in a highlight manner or using a special font.

After the text link is displayed on the group chat interface, all the group members may perform a preset trigger operation for the text link to trigger the APP to jump to the corresponding target page. Meanwhile, the APP may monitor the trigger event with respect to the text link at the background. When a preset trigger event corresponding to the preset trigger operation with respect to the text link is monitored, a page jump instruction carried in the trigger message may be automatically executed at the background to jump to a corresponding target page. After the APP jumps to the corresponding target page, the APP may acquire target information input in the target page, and upload the acquired target information to a corresponding service end, to complete collection of the target information.

The above described technical solution is hereinafter illustrated with reference to two specific application examples.

In one aspect, assume that the target page is a group sign-in page. In this case, the trigger option may be a trigger option "you are invited to sign in" on the group sign-in page.

When the APP has monitored a click event with respect to the trigger option on the page, the APP may output the first setting interface to the preset group member, and acquire the prompt text input by the preset group member in the first setting interface. Afterwards, the APP may create the trigger message based on the acquired prompt text and a preset page jump instruction for jumping to the target page.

The prompt text may be a prompt text "please upload your own geographical location to complete sign-in", the page jump instruction may be a page jump instruction "mitalk://control/jump_to_location" (which indicates jumping to a location page) defined in the APP system. In this case, the trigger message generated by the APP may be a trigger message "please upload your own geographical location to complete sign-in {mitalk://control/jump_to_location}". When the trigger message is successfully created, the APP may mass-send the trigger message to the other group members in the current group.

When the other group members receive the trigger message, a text link "please upload your own geographical location to complete sign-in" may be highlighted on the group chat interface. In this case, the APP may monitor in real time the preset trigger event with respect to the text link at the background.

When the APP has monitored the preset trigger event (for example, a click event) with respect to the text link, the instruction "mitalk:/control/jump_to_location" may be automatically executed at the background to jump to the location page. An option "upload location" may be provided on the location page, and the local group member may click the option to upload his or her own geographical location information to the service end to complete sign-in. Upon completion of sign-in, the APP may synchronize the geographical location information uploaded by all the group members that is stored at the service end to a local terminal, for all the group members in the group to check.

Accordingly, in this manner, when the group members are using the group sign-in service provided by the APP, the group manager may quickly collect the geographical location information of all the group members, thereby greatly improving user's group chat experience.

In another aspect, assume that the target page is a group album page. In this case, the trigger option may be a trigger option "you are invited to upload photos" on the main page or each of the subpages of the group album page. When the APP has monitored a click event with respect to the trigger option on the main page, the APP may output the second setting interface to the preset group member, acquire the prompt text input by the preset group member in the second setting interface and a target subpage selected in the second setting interface, and generate a page jump instruction for jumping to the target subpage at the background. Afterwards, the APP may create the trigger message based on the acquired prompt text and the generated page jump instruction. Nevertheless, when the APP has monitored the click event with respect to the trigger option on the subpage, the APP may output the first setting interface to the preset group member. For example, when the preset group member has created a subalbum, the trigger option in the subalbum may be clicked to trigger the APP to mass-send the trigger message. The specific implementation is not described herein any further.

The prompt text may be a prompt text "please upload your photos of this activity", the page jump instruction may be a page jump instruction "mitalk://control/jump_to_take$_{13}$ photo" (which indicates jumping to an upload page of the selected subalbum) defined in the APP system. In this case, the trigger message generated by the APP may be a trigger message "please upload your photos of this activity {mitalk://control/jump_to_take_photo}". When the trigger message is successfully created, the APP may mass-send the trigger message to the other group members in the current group.

When the other group members receive the trigger message, a text link "please upload your photos of this activity" may be highlighted on the group chat interface. In this case, the APP may monitor in real time the preset trigger event with respect to the text link at the background.

When the APP has monitored the preset trigger event (for example, a click event) with respect to the text link, the instruction "mitalk://control/jump_to_take_photo" may be automatically executed at the background to jump to an upload page of the selected subalbum. An option "upload photos" may be provided on the upload page, and the local group member may click the option to select locally stored photos to be uploaded, and then upload the selected photos to the selected subalbum at the service end. Upon completion of photo uploading, the APP may synchronize the photos uploaded by all the group members into the subalbum that are stored at the service end to a local terminal, for all the group members in the group to check.

Accordingly, in this manner, when the group members are using the group album service provided by the APP, the group manager may quickly collect the photos of all the group members, thereby greatly improving user's group chat experience.

In addition, during implementation, the target page may also be a group activity page, and the group activity page may include a plurality of group activity subjects, wherein each subject may correspond to a subpage. The trigger option may be respectively provided on the main page and the subpages. The preset group member may perform a preset trigger operation for the trigger option to select an activity subject, trigger the APP to collect text information or voice information fed back by the local group members with respect to the activity subject, and then upload the collected information to the corresponding service end. With respect to such an application scenario, the specific implementation is the same as the implementation in the above described application scenario where the target page is a group album page, which is thus not described herein any further.

In the above embodiment, a trigger message including a prompt text and a page jump instruction mass-sent by a preset group member is received; a corresponding text link is generated based on the prompt text, and the text link is displayed on the group chat interface; and the page jump instruction is executed to jump to a corresponding target page to complete collection of target information when a preset trigger event with respect to the text link is monitored. In this way, target information of the group members is quickly collected during group chatting, which is favorable to improving user's group chat experience.

Figure 2:
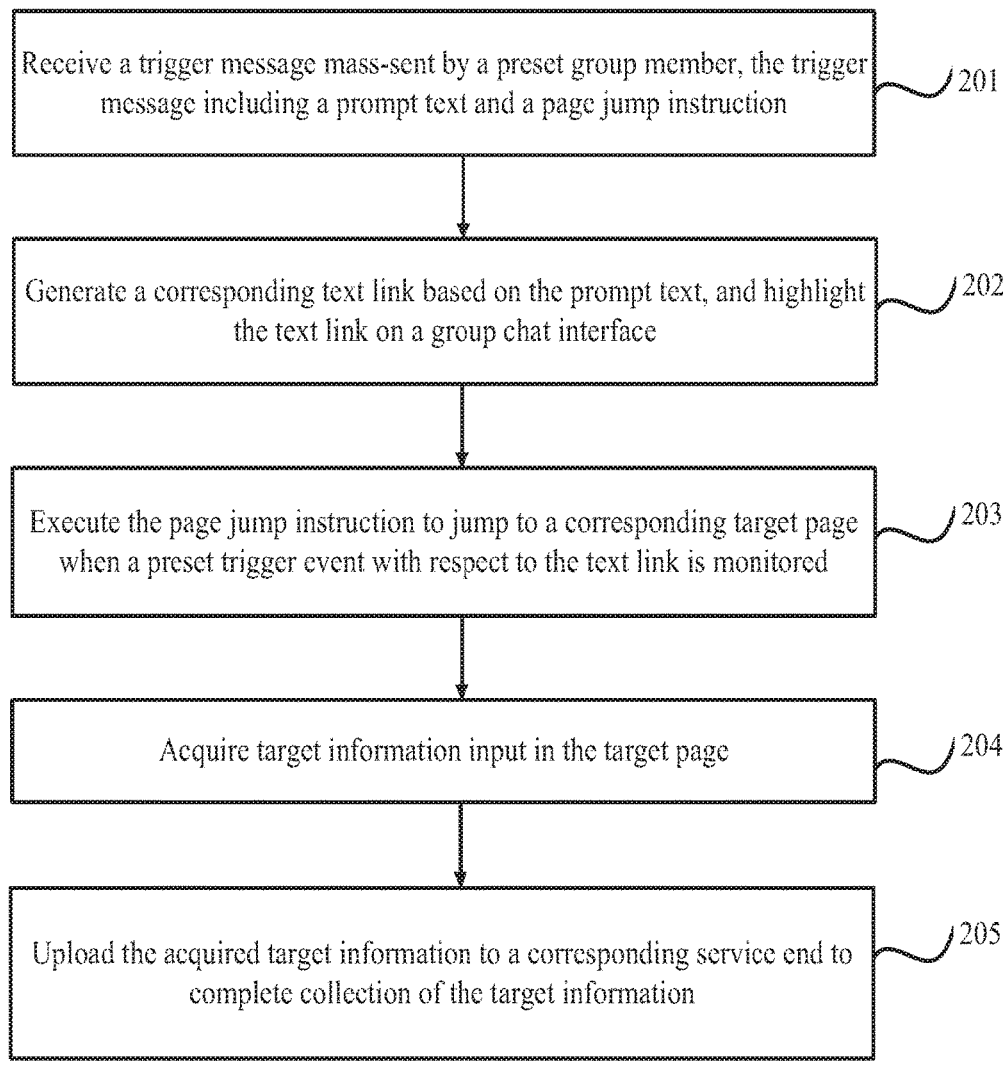
FIG. 2 is a schematic flowchart illustrating another information collection method according to an exemplary embodiment of the present disclosure.

FIG. 2 illustrates an information collection method according to an exemplary embodiment of the present disclosure. As illustrated in FIG. 2, the information collection method is applied in a terminal, and includes the following steps.

In step 201, a trigger message mass-sent by a preset group member is received, wherein the trigger message includes a prompt text and a page jump instruction.

In step 202, a corresponding text link is generated based on the prompt text, and the text link is highlighted on a group chat interface.

In step 203, when a preset trigger event with respect to the text link is monitored, the page jump instruction is executed to jump to a corresponding target page.

In step 204, target information input in the target page is acquired.

In step 205, the acquired target information is uploaded to a corresponding service end to complete collection of the target information.

The technical solution disclosed in step 201 to step 205 may be understood as an information collection logic loaded in group chat client software (for example, an instant messaging APP) installed in the above terminal. The group chat client software may quickly collect target information of group members during group chatting by running the above information collection logic.

In this embodiment, the above terminal may be a mobile terminal of a user. For example, the mobile terminal may be a touch-screen smart phone of the user. The target page may include a group album page, a group sign-in page, and a group activity page; and the target information may include picture information, geographical location information, voice information, and text information. Nevertheless, during implementation, the above target page and target information may include other content besides the content mentioned in the above description.

When the user is engaged in a group chat by using client software (hereinafter referred to as APP) installed in the terminal, in addition to providing a group chat service for the user, the APP may generally provide value-added services. When the user uses the value-added services provided by the APP, the APP generally has a demand on quickly collecting the target information relevant to the value-added services, wherein the target information is generated in the course of using the value-added services by all group members.

For example, in addition to providing the group chat service, the APP may provide such functions as a group album, a group sign-in, and a group activity for the user. When the user enables the group album function and has created a group album relevant to an offline activity, the APP generally has a demand on collecting photos relevant to the offline activity. When the user enables the group sign-in function, the APP generally has a demand on quickly collecting the sign-in information such as geographical location information of all group members. When the user enables the group activity function, the APP generally has a demand on collecting text feedback information or voice feedback information of all the group members with respect to the initiated offline activity.

In the related art, when the APP collects the target information relevant to the value-added services that is generated in the course of using the value-added services by all the group members, collection of the target information is generally dependent on user's initiative uploading. As a result, the target information of all the group members may not be quickly collected.

In this embodiment, to more quickly collect the target information of all the group members, a trigger option may be preset in the target page, wherein the trigger option is configured to trigger mass-sending of the trigger message to all the group members.

When a preset group member is using the value-added services provided by the APP, by performing a preset trigger operation for the trigger option, the APP may be triggered to mass-send a trigger message to the other group members. The trigger message may include a prompt text and a page jump instruction. The prompt text may be prompt information input by the preset group member in a customization manner, and the page jump instruction may be an instruction defined by the APP system for jumping to a target page.

Meanwhile, when the preset group member is using the value-added services, the APP may monitor in real time a trigger event with respect to the trigger option, and judge whether the monitored trigger event is a preset trigger event corresponding to the preset trigger operation. If the monitored trigger event is the preset trigger event corresponding to the preset trigger operation, the APP may be triggered to mass-send the trigger message to the other group members.

It should be noted that, in practical application, the target page may be an independent page, or may include a plurality of subpages. For example, when the target page is a group sign-in page, the target page is generally an independent page; when the target page is a group album page, the target page may generally include a plurality of subalbums, and in this case, the target page may further include, in addition to the main page, a plurality of subpages corresponding to the plurality of subalbums respectively; and when the target page is a group activity page, the target page may generally include a plurality of activity subjects, and in this case, the target page may further include, in addition to the main page, a plurality of subpages corresponding to the plurality of activity subjects respectively.

Hereinafter, with respect to the above two circumstances, the process of mass-sending the trigger message by the APP to all the group members is described.

In an illustrated implementation manner, when the target page is an independent page, the trigger option may be preset in the independent page of the target page. When the APP has monitored the preset trigger event with respect to the trigger option, a first setting interface may be output to the preset group member. In this case, the preset group member may input a prompt text in the first setting interface.

When the prompt text is successfully input, the APP may acquire the prompt text input by the preset group member in the first setting interface, and then create the trigger message based on the acquired prompt text and a preset page jump instruction for jumping to the target page. When the trigger message is successfully created, the trigger message may be mass-sent to all the group members by using the group chat function of the APP. The preset trigger operation may be a click operation, and the preset trigger event may be a click event corresponding to the click operation.

In another illustrated implementation manner, when the target page includes a plurality of subpages, the trigger option may be respectively preset in the main page and the plurality of subpages of the target page. When the APP has monitored the preset trigger event with respect to the trigger option on the subpage, the first setting interface may still be output to the preset group member. The specific implementation is not described herein any further.

When the APP has monitored the preset trigger event with respect to the trigger option on the main page, a second setting interface may be output to the preset group member. In this case, the preset group member may input a prompt text in the second setting interface, and select a corresponding target subinterface in the second setting interface.

When the prompt text is successfully input, the APP may acquire the prompt text input by the preset group member in the second setting interface and the target subinterface selected in the second setting interface, generate a page jump instruction for jumping to the target subinterface at the background, and create the trigger message based on the acquired prompt text and the generated page jump instruction. When the trigger message is successfully created, the trigger message may be mass-sent to all the group members by using the group chat function of the APP.

The preset group member may be a group manager or a group member having equivalent rights. For example, when the target page is a group sign-in page, the preset group member may be a group manager; and when the target page is a group album page, the preset group member may be a group manager and creators of the subalbums in the group album page. When the target page is a group activity page, the preset group member may be a group manager and initiators of the activities on the group activity page.

In this embodiment, when the APP has mass-sent the trigger message, after the APP of each of all the group members receives the trigger message, a corresponding text link may be generated based on the prompt text in the trigger message, and then the generated text link is displayed on the group chat interface. Since there are masses of group chat messages on the group chat interface, the APP may highlight the text link on the group chat interface when displaying the text link. For example, the text link may be displayed in a highlight manner or using a special font.

After the text link is displayed on the group chat interface, all the group members may perform a preset trigger operation for the text link to trigger the APP to jump to the corresponding target page. Meanwhile, the APP may monitor the trigger event with respect to the text link at the background. When a preset trigger event corresponding to the preset trigger operation with respect to the text link is monitored, a page jump instruction carried in the trigger message may be automatically executed at the background to jump to a corresponding target page. After the APP jumps to the corresponding target page, the APP may acquire target information input in the target page, and upload the acquired target information to a corresponding service end, to complete collection of the target information.

The above described technical solution is hereinafter illustrated with reference to two specific application examples.

In one aspect, assume that the target page is a group sign-in page. In this case, the trigger option may be a trigger option for "inviting the group members to sign in" on the group sign-in page.

When the APP has monitored a click event with respect to the trigger option on the page, the APP may output the first setting interface to the preset group member, and acquire the prompt text input by the preset group member in the first setting interface. Afterwards, the APP may create the trigger message based on the acquired prompt text and a preset page jump instruction for jumping to the target page.

The prompt text may be a prompt text "please upload your own geographical location to complete sign-in", the page jump instruction may be a page jump instruction "mitalk://control/jump_to_location" (which indicates jumping to a location page) defined in the APP system. In this case, the trigger message generated by the APP may be a trigger message "please upload your own geographical location to complete sign-in {mitalk://control/jump_to_location}". When the trigger message is successfully created, the APP may mass-send the trigger message to the other group members in the current group.

When the other group members receive the trigger message, a text link "please upload your own geographical location to complete sign-in" may be highlighted on the group chat interface. In this case, the APP may monitor in real time the preset trigger event with respect to the text link at the background.

When the APP has monitored the preset trigger event (for example, a click event) with respect to the text link, the instruction "mitalk://control/jump_to_location" may be automatically executed at the background to jump to the location page. An option "upload location" may be provided on the location page, and the local group member may click the option to upload his or her own geographical location information to the service end to complete sign-in. Upon completion of sign-in, the APP may synchronize the geographical location information uploaded by all the group members that is stored at the service end to a local terminal, for all the group members in the group to check.

Accordingly, in this manner, when the group members are using the group sign-in service provided by the APP, the group manager may quickly collect the geographical location information of all the group members, thereby greatly improving user's group chat experience.

In another aspect, assume that the target page is a group album page. In this case, the trigger option may be a trigger option "you are invited to upload photos" on the main page or each of the subpages of the group album page. When the APP has monitored a click event with respect to the trigger option on the main page, the APP may output the second setting interface to the preset group member, acquire the prompt text input by the preset group member in the second setting interface and a target subpage selected in the second setting interface, and generate a page jump instruction for jumping to the target subpage at the background. Afterwards, the APP may create the trigger message based on the acquired prompt text and the generated page jump instruction. Nevertheless, when the APP has monitored the click event with respect to the trigger option on the subpage, the APP may output the first setting interface to the preset group member. For example, when the preset group member has created a subalbum, the trigger option in the subalbum may be clicked to trigger the APP to mass-send the trigger message. The specific implementation is not described herein any further.

The prompt text may be a prompt text "please upload your photos of this activity", the page jump instruction may be a page jump instruction "mitalk://control/jump_to_take_photo" (which indicates jumping to an upload page of the selected subalbum) defined in the APP system. In this case, the trigger message generated by the APP may be a trigger message "please upload your photos of this activity {mitalk://control/jump_to_take_photo}". When the trigger message is successfully created, the APP may mass-send the trigger message to the other group members in the current group.

When the other group members receive the trigger message, a text link "please upload your photos of this activity" may be highlighted on the group chat interface. In this case, the APP may monitor in real time the preset trigger event with respect to the text link at the background.

When the APP has monitored the preset trigger event (for example, a click event) with respect to the text link, the instruction "mitalk://control/jump_to_take_photo" may be automatically executed at the background to jump to an upload page of the selected subalbum. An option "upload photos" may be provided on the upload page, and the local group member may click the option to select locally stored photos to be uploaded, and then upload the selected photos to the selected subalbum at the service end. Upon completion of photo uploading, the APP may synchronize the photos uploaded by all the group members into the subalbum that are stored at the service end to a local terminal, for all the group members in the group to check.

Accordingly, in this manner, when the group members are using the group album service provided by the APP, the group manager may quickly collect the photos of all the group members, thereby greatly improving user's group chat experience.

In addition, during implementation, the target page may also be a group activity page, and the group activity page may include a plurality of group activity subjects, wherein each subject may correspond to a subpage. The trigger option may be respectively provided on the main page and the subpages. The preset group member may perform a preset trigger operation for the trigger option to select an activity subject, trigger the APP to collect text information or voice information fed back by the local group members with respect to the activity subject, and then upload the collected information to the corresponding service end. With respect to such an application scenario, the specific implementation is the same as the implementation in the above described application scenario where the target page is a group album page, which is thus not described herein any further.

In the above embodiment, a trigger message including a prompt text and a page jump instruction mass-sent by a preset group member is received; a corresponding text link is generated based on the prompt text, and the text link is displayed on the group chat interface; and the page jump instruction is executed to jump to a corresponding target page to complete collection of target information when a preset trigger event with respect to the text link is monitored. In this way, target information of the group members is quickly collected during group chatting, which is favorable to improving user's group chat experience.

Corresponding to the above embodiment of the information collection method, the present disclosure further provides an embodiment of an information collection apparatus.

Figure 3:
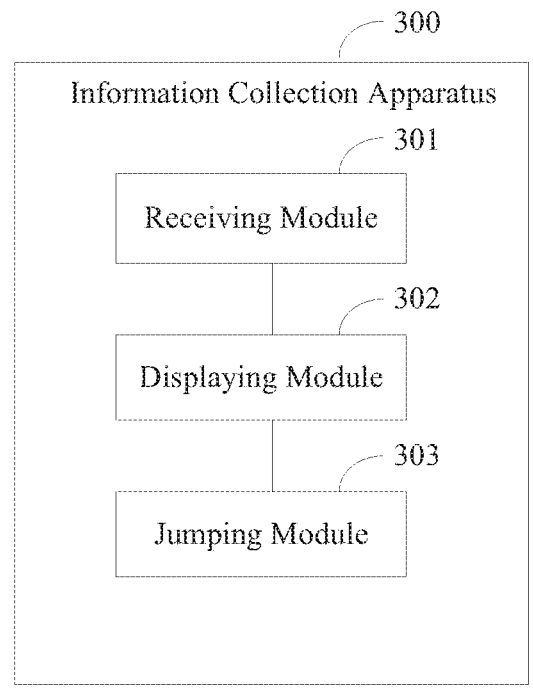
FIG. 3 is a schematic block diagram illustrating an information collection apparatus according to an exemplary embodiment of the present disclosure.

FIG. 3 is a schematic block diagram illustrating an information collection apparatus according to an exemplary embodiment of the present disclosure.

As illustrated in FIG. 3, an information collection apparatus 300 according to an exemplary embodiment of the present disclosure includes: a receiving module 301, a displaying module 302, and a jumping module 303.

The receiving module 301 is configured to receive a trigger message mass-sent by a preset group member, the trigger message including a prompt text and a page jump instruction.

The displaying module 302 is configured to generate a corresponding text link based on the prompt text, and display the text link on a group chat interface.

The jumping module 303 is configured to execute the page jump instruction to jump to a corresponding target page to complete collection of target information when a preset trigger event with respect to the text link is monitored.

In the above embodiment, a trigger message including a prompt text and a page jump instruction mass-sent by a preset group member is received; a corresponding text link is generated based on the prompt text, and the text link is displayed on the group chat interface; and the page jump instruction is executed to jump to a corresponding target page to complete collection of target information when a preset trigger event with respect to the text link is monitored. In this way, target information of the group members is quickly collected during group chatting, which is favorable to improving user's group chat experience.

Figure 4:
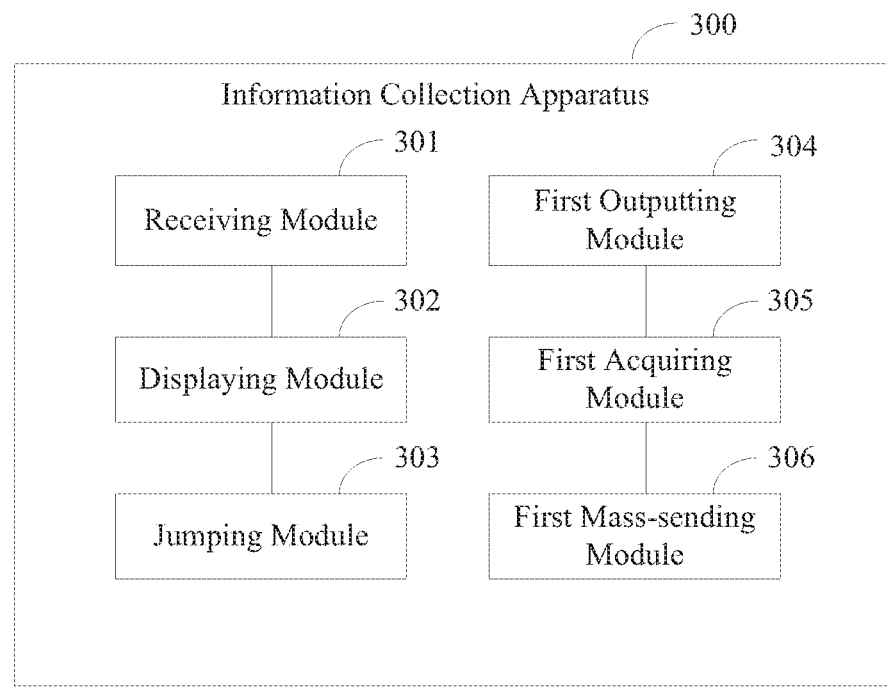
FIG. 4 is a schematic block diagram illustrating another information collection apparatus according to an exemplary embodiment of the present disclosure.

Referring to FIG. 4, FIG. 4 is a block diagram of another apparatus according to an exemplary embodiment of the present disclosure. Based on the embodiment as illustrated in FIG. 3, in this embodiment, when a local group member is the preset group member, the target page includes a preset trigger option, wherein the preset trigger option is configured to trigger mass-sending of the trigger message to all the group members; and the apparatus 300 may further include: a first outputting module 304, a first acquiring module 305, and a first mass-sending module 306.

The first outputting module 304 is configured to output a first setting interface when a preset trigger event with respect to the preset trigger option is monitored.

The first acquiring module 305 is configured to acquire a prompt text input in the first setting interface.

The first mass-sending module 306 is configured to create the trigger message based on the prompt text acquired by the first acquiring module 305 and a preset page jump instruction for jumping to the target page, and mass-send the trigger message to all the group members.

Figure 5:
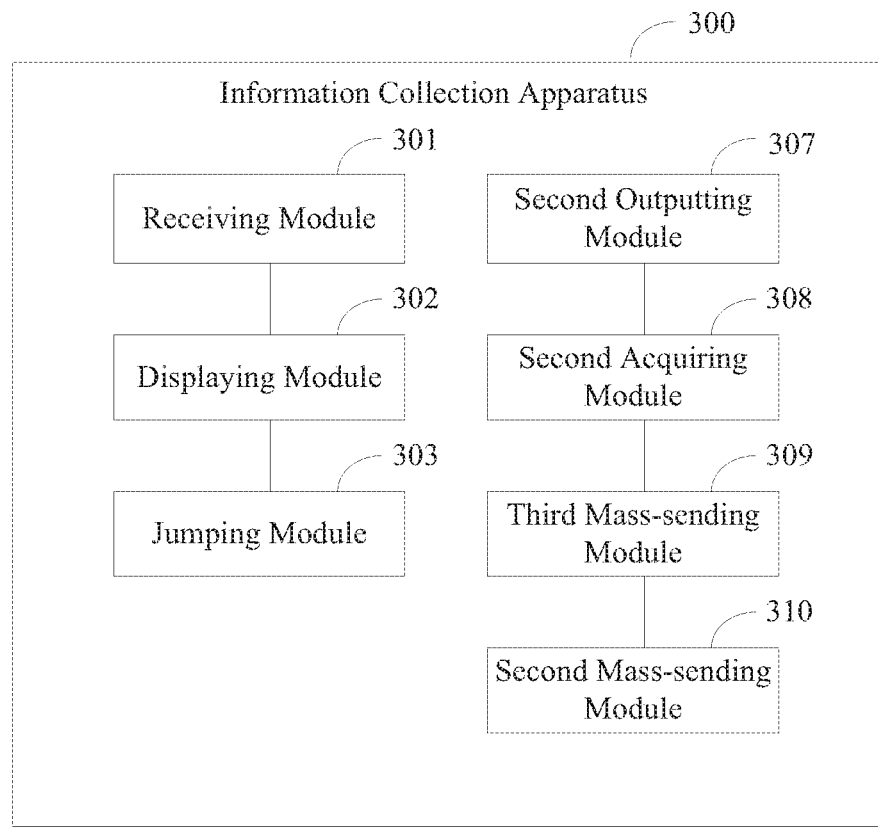
FIG. 5 is a schematic block diagram illustrating still another information collection apparatus according to an exemplary embodiment of the present disclosure.

Referring to FIG. 5, FIG. 5 is a block diagram of still another apparatus according to an exemplary embodiment of the present disclosure. Based on the embodiment as illustrated in FIG. 3, in this embodiment, when a local group member is the preset group member, the target page includes a preset trigger option, wherein the preset trigger option is configured to trigger mass-sending of the trigger message to all the group members; and the apparatus 300 may further include: a second outputting module 307, a second acquiring module 308, a third acquiring module 309, and a second mass-sending module 310.

The second outputting module 307 is configured to output a second setting interface when a preset trigger event with respect to the preset trigger option is monitored.

The second acquiring module 308 is configured to acquire a prompt text input by a user in the second setting interface.

The third acquiring module 309 is configured to acquire a target page selected by the user in the second setting interface, and generate a page jump instruction for jumping to the target page.

The second mass-sending module 310 is configured to create the trigger message based on the prompt text acquired by the second acquiring module 308 and the page jump instruction generated by the third acquiring module 309, and mass-send the trigger message to all the group members.

It should be noted that the structures of the second outputting module 307, the second acquiring module 308, the third acquiring module 309, and the second mass-sending module 310 in the apparatus embodiment as illustrated in FIG. 5 may also be included in the apparatus embodiment as illustrated in FIG. 4, which are not limited in the present disclosure.

Figure 6:
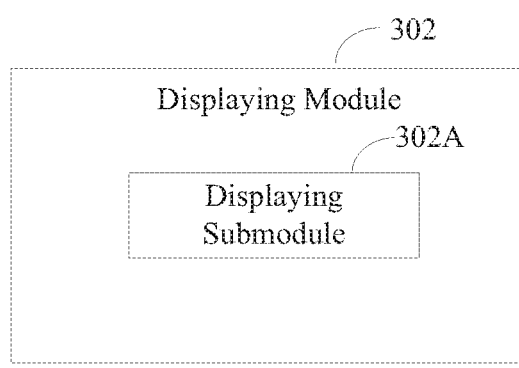
FIG. 6 is a schematic block diagram illustrating yet still another information collection apparatus according to an exemplary embodiment of the present disclosure.

Referring to FIG. 6, FIG. 6 is a block diagram of yet still another apparatus according to an exemplary embodiment of the present disclosure. Based on the embodiment as illustrated in FIG. 3, in this embodiment, the displaying module 302 may include a displaying submodule 302A.

The displaying submodule 302A is configured to highlight the text link on the group chat interface.

It shall be noted that, the structure of the displaying submodule 302A as illustrated in the apparatus embodiment of FIG. 6 may also be included in the apparatus embodiments as illustrated in FIG. 4 to FIG. 5, which is not limited in the present disclosure.

In the above embodiments, the target page may include a group album page, a group sign-in page, and a group activity page; and the target information may include picture information, geographical location information, voice information, and text information.

Specific implementation of functions and effects of various modules in the above apparatuses may be referenced to the implementation of the corresponding steps in the methods, which is thus not described herein any further.

With respect to the apparatus embodiments, since the apparatus embodiments are based on the method embodiments, relevant parts may be referenced to the equivalents in the method embodiments. The above-described apparatus embodiments are merely exemplary. The modules described as separate components may be or may not be physically independent of each other. The element illustrated as a module may be or may not be a physical module, that is be either located at a position or deployed on a plurality of network modules. Part of or all of the modules may be selected as required to implement the technical solutions disclosed in the embodiments of the present disclosure. Based on the disclosure, persons of ordinary skills in the art may understand and implement the embodiments without any creative effort.

Correspondingly, the present disclosure further provides an apparatus for use in information collection. The apparatus includes:

a processor; and a memory for storing instructions executable by the processor;

wherein the processor is configured to:

receive a trigger message mass-sent by a preset group member, the trigger message including a prompt text and a page jump instruction;

generate a corresponding text link based on the prompt text, and display the text link on a group chat interface; and execute the page jump instruction to jump to a corresponding target page to complete collection of target information when a preset trigger event with respect to the text link is monitored.

Correspondingly, the present disclosure further provides a terminal. The terminal may include a memory and at least one program, wherein at least one program is stored in the memory, and is configured to be run by at least one processor to execute instructions, stored in the at least one program, for performing the following operations:

receiving a trigger message mass-sent by a preset group member, the trigger message including a prompt text and a page jump instruction;

generating a corresponding text link based on the prompt text, and displaying the text link on a group chat interface; and executing the page jump instruction to jump to a corresponding target page to complete collection of target information when a preset trigger event with respect to the text link is monitored.

Figure 7:
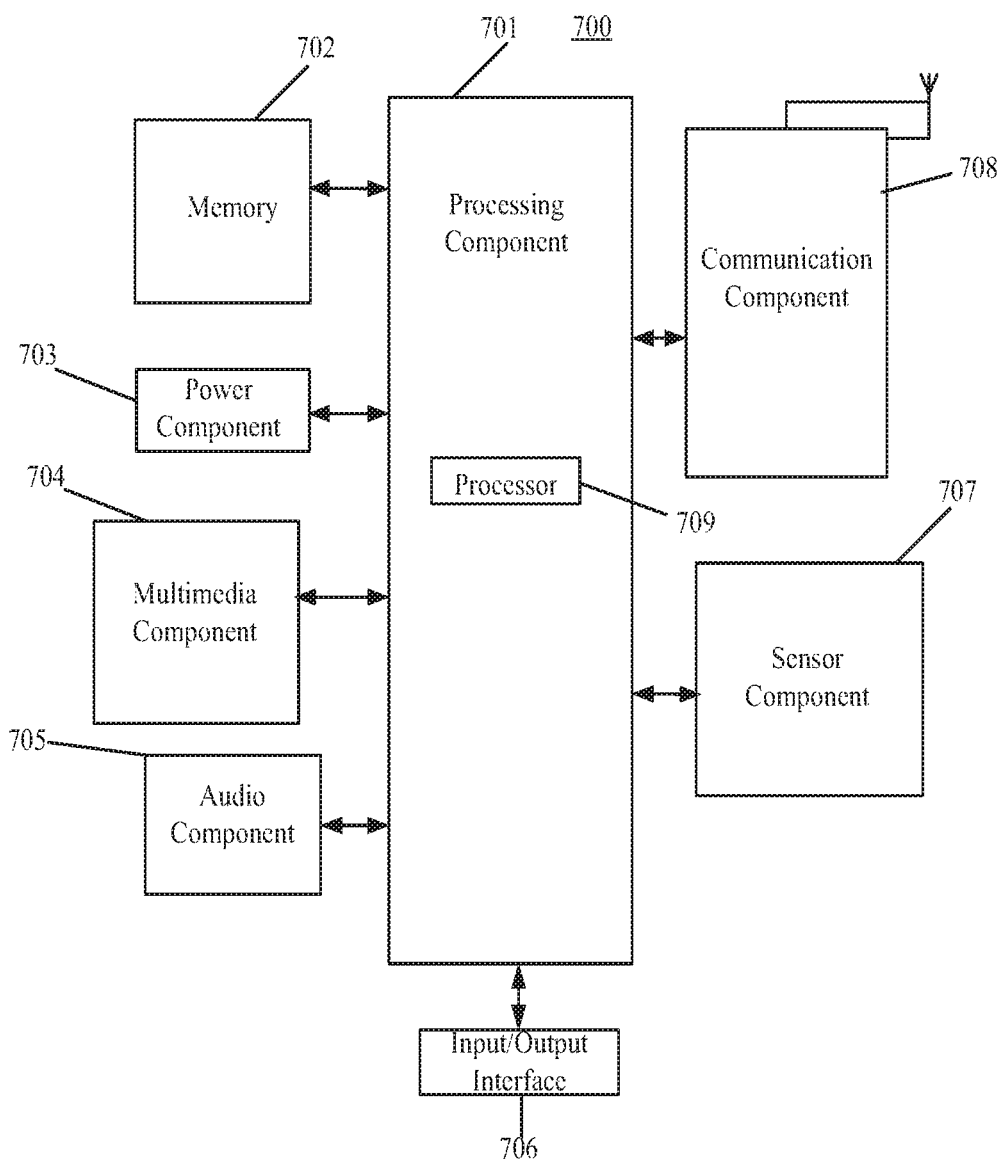
FIG. 7 is a schematic structural diagram illustrating an apparatus for use in information collection according to an exemplary embodiment of the present disclosure.

FIG. 7 is a schematic structural diagram illustrating an apparatus for use in information collection according to an exemplary embodiment of the present disclosure.

FIG. 7 illustrates an apparatus 700 for use in information collection according to an exemplary embodiment of the present disclosure. The apparatus 700 may be a mobile phone, a smart device, a computer, a digital broadcast terminal, a messaging device, a gaming console, a tablet, a medical device, exercise equipment, a personal digital assistant, and the like.

Referring to FIG. 7, the apparatus 700 may include one or more of the following components: a processing component 701, a memory 702, a power component 703, a multimedia component 704, an audio component 705, an input/output (I/O) interface 706, a sensor component 707, and a communication component 708.

The processing component 701 typically controls overall operations of the apparatus 700, such as the operations associated with display, telephone calls, data communications, camera operations, and recording operations. The processing component 701 may include one or more processors 709 to execute instructions to perform all or a part of the steps in the above-described methods. In addition, the processing component 701 may include one or more modules which facilitate the interaction between the processing component 701 and other components. For example, the processing component 701 may include a multimedia module to facilitate the interaction between the multimedia component 704 and the processing component 701.

The memory 702 is configured to store various types of data to support the operations of the apparatus 700. Examples of such data include instructions for any application or method operated on the apparatus 700, contact data, phonebook data, messages, pictures, videos, and the like. The memory 702 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 703 provides power to various components of the apparatus 700. The power component 703 may include a power management system, one or more power supplies, and other components associated with the generation, management, and distribution of power in the apparatus 700.

The multimedia component 704 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 704 includes a front camera and/or a rear camera. The front camera and/or the rear camera may receive external multimedia data while the apparatus 700 is in an operation mode, such as a photographing mode or a video mode. Each of the front camera and the rear camera may be a fixed optical lens system or have focus and optical zoom capability.

The audio component 705 is configured to output and/or input audio signals. For example, the audio component 705 includes a microphone (MIC) configured to receive an external audio signal when the apparatus 700 is in an operation mode, such as a call mode, a recording mode, or a voice recognition mode. The received audio signal may be further stored in the memory 702 or transmitted via the communication component 708. In some embodiments, the audio component 705 further includes a speaker to output audio signals.

The I/O interface 702 provides an interface between the processing component 701 and a peripheral interface module, such as a keyboard, a click wheel, a button, or the like. The buttons may include, but are not limited to, a home button, a volume button, a starting button, and a locking button.

The sensor component 707 includes one or more sensors to provide status assessments of various aspects of the apparatus 700. For example, the sensor component 707 may detect an open/closed status of the apparatus 700, relative positioning of components, e.g., the display and the keypad, of the apparatus 700; and the sensor component 707 may further detect a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 707 may include a proximity sensor configured to detect the presence of nearby objects without any physical contact. The sensor component 707 may also include a light sensor, such as a CMOS or CCD image sensor, for use in imaging applications. In some embodiments, the sensor component 707 may also include an accelerometer sensor, a gyroscope sensor, a magnetic sensor, a pressure sensor, or a temperature sensor.

The communication component 708 is configured to facilitate wired or wireless communications between the apparatus 700 and other devices. The apparatus 700 may access a wireless network based on a communication standard, such as WiFi, 2G, or 3G, or a combination thereof. In one exemplary embodiment, the communication component 708 receives a broadcast signal or broadcast associated information from an external broadcast management system via a broadcast channel. In one exemplary embodiment, the communication component 708 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 702, executable by the processor 709 in the apparatus 700, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

When instructions stored in the storage medium are executed by a processor of a mobile terminal, the mobile terminal is caused to perform an information collection method, including:

receiving a trigger message mass-sent by a preset group member, the trigger message including a prompt text and a page jump instruction;

generating a corresponding text link based on the prompt text, and displaying the text link on a group chat interface; and executing the page jump instruction to jump to a corresponding target page to complete collection of target information when a preset trigger event with respect to the text link is monitored.

It is noted that the various modules, sub-modules, units and components in the present disclosure can be implemented using any suitable technology. In an example, a module can be implemented using circuitry, such as integrated circuit (IC). In another example, a module can be implemented as a processing circuit executing software instructions.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

The invention claimed is:

1. A method for collecting information, comprising:

receiving, at a terminal device having a user account in a social group that is established by a communication service, a trigger message that is sent by a specific user account of the social group to members of the social group, the trigger message comprising a prompt text and a jump instruction to a page for collecting specific information;

generating a text link associated with the jump instruction based on the prompt text;

displaying the text link on an interface page for the communication service;

detecting a trigger event with respect to the text link;

executing the jump instruction to display the page for collecting the specific information in response to detecting the trigger event;

providing, via the page, a first option to access stored information within a data storage at the terminal device, wherein the stored information includes the specific information;

receiving a user selection of a subset of the stored information from within the data storage;

transmitting the subset of the stored information to a server that is configured to compile a plurality of information including the subset of the stored information and provide the compiled plurality of information for access to each one of a plurality of user accounts that transmitted to the server the respective specific information of the plurality of information, wherein the compiled plurality of information including the subset of the stored information further includes a plurality of subsets of stored information acquired from the plurality of user accounts, wherein contents of the plurality of subsets of stored information are accessible via a target page that is configured to display the plurality of compiled information in a form of a plurality of links to a plurality of subpages that are each associated with a corresponding one of the plurality of subsets of stored information, and wherein the contents of the plurality of subsets of stored information are viewable by each one of the plurality of user accounts via the plurality of subpages that are accessible via the target page.

2. The method according to claim 1, wherein the user account is the specific user account that initiates operations for collecting information, and the method further comprises:

displaying the page for collecting the specific information with a trigger option to initiate the operations for collecting information from the members of the social group;

detecting that the trigger option is selected; and generating the trigger message to be sent to the members of the social group.

3. The method according to claim 2, wherein the method further comprises:

displaying a first setting interface page when the selection of the trigger option is detected;

receiving an input of the prompt text via the first setting interface page;

generating the trigger message based on the received prompt text and the jump instruction to the page for collecting the specific information; and causing the trigger message to be sent to the members of the social group.

4. The method according to claim 2, wherein the method further comprises:
  displaying a second setting interface page when the selection of the trigger option is detected, the second setting interface being used to receive the prompt text and a selection of the page from a plurality of pages;
  receiving an input of the prompt text via the second setting interface page;
  receiving the selection of the page from the plurality of pages via the second setting interface page;
  generating the jump instruction for jumping to the page;
  generating the trigger message based on the received prompt text and the generated jump instruction; and
  causing the trigger message to be sent to the members of the social group.

5. The method according to claim 1, wherein displaying the text link on the interface page for the communication service comprises:
  highlighting the text link on the interface page.

6. The method according to claim 1, wherein executing the jump instruction to display the page for collecting the specific information when the trigger event with respect to the text link is detected comprises:
  executing the jump instruction to display the page for collecting the specific information;
  receiving an input of the specific information via the page; and
  uploading the received specific information to the server for providing the communication service for the server to collect the specific information.

7. The method according to claim 1, wherein the page is at least one of a group album page for collecting picture information, a group sign-in page for collecting geographical location information, and a group activity page for collecting voice information and text information.

8. An apparatus for use in collecting information, comprising:
  a processor; and
  a memory for storing instructions executable by the processor;
  wherein the processor is configured to:
    receive, under a user account in a social group that is established by a communication service, a trigger message that is sent by a specific user account of the social group to members of the social group, the trigger message comprising a prompt text and a jump instruction to a page for collecting specific information;
    generate a text link associated with the jump instruction based on the prompt text;
    cause the text link to be displayed on an interface page for the communication service;
    detect a trigger event with respect to the text link;
    execute the jump instruction to display the page for collecting the specific information in response to detecting the trigger event;
    provide, via the page, a first option to access stored information within a data storage at the terminal device, wherein the stored information includes the specific information;
    receive a user selection of a subset of the stored information from within the data storage;
    transmit the subset of the stored information to a server that is configured to compile a plurality of information including the subset of the stored information and provide the compiled plurality of information for access to each one of a plurality of user accounts that transmitted to the server the respective specific information of the plurality of information,
    wherein the compiled plurality of information including the subset of the stored information further includes a plurality of subsets of stored information acquired from the plurality of user accounts,
    wherein contents of the plurality of subsets of stored information are accessible via a target page that is configured to display the plurality of compiled information in a form of a plurality of links to a plurality of subpages that are each associated with a corresponding one of the plurality of subsets of stored information, and
    wherein the contents of the plurality of subsets of stored information are viewable by each one of the plurality of user accounts via the plurality of subpages that are accessible via the target page.

9. The apparatus according to claim 8, wherein the user account is the specific user account who initiates operations of collecting information, and the processor is configured to:
  cause the page for collecting the specific information to be displayed with a trigger option to initiate the operations of collecting information from the members of the social group;
  detect that the trigger option is selected; and
  generate the trigger message to be sent to the members of the social group.

10. The apparatus according to claim 9, wherein the processor is further configured to:
  cause a first setting interface page to be displayed when the selection of the trigger option is detected;
  receive an input of the prompt text via the first setting interface page; and
  generate the trigger message based on the received prompt text and the jump instruction to the page for collecting the specific information; and
  cause the trigger message to be sent to the members of the social group.

11. The apparatus according to claim 9, wherein the processor is further configured to:
  cause a second setting interface page to be displayed when the selection of the trigger option is detected, the second setting interface being used to receive the prompt text and a selection of the page from a plurality of pages;
  receive an input of the prompt text via the second setting interface page;
  receive the selection of the page from a plurality of pages via the second setting interface page;
  generate the jump instruction for jumping to the page;
  generate the trigger message based on the received prompt text and the generated jump instruction; and
  cause the trigger message to be sent to the members of the social group.

12. The apparatus according to claim 8, wherein the processor is further configured to:
  cause the text link to be highlighted on the interface page.

13. The apparatus according to claim 8, wherein the processor is further configured to:
  execute the jump instruction to display the page for collecting the specific information;
  receive an input of the specific information via the page; and
  upload the received specific information to the server for providing the communication service for the server to collect the specific information.

14. The apparatus according to claim 8, wherein the page is at least one of a group album page for collecting picture information, a group sign-in page for collecting geographical location information, and a group activity page for collecting voice information and text information.

15. A non-transitory computer-readable storage medium having stored therein instructions that, when executed by one or more processors of an apparatus, cause the apparatus to perform operations for collecting information, the operations comprising:
   receiving, at the apparatus having a user account in a social group established by a communication service, a trigger message that is sent by a specific user account of the social group to members of the social group, the trigger message comprising a prompt text and a jump instruction to a page for collecting specific information;
   generating a text link associated with the jump instruction based on the prompt text;
   displaying the text link on an interface page for the communication service;
   detecting a trigger event with respect to the text link;
   executing the jump instruction to display the page for collecting the specific information in response to detecting the trigger event;
   providing, via the page, a first option to access stored information within a data storage at the terminal device, wherein the stored information includes the specific information;
   receiving a user selection of a subset of the stored information from within the data storage;
   transmitting the subset of the stored information to a server that is configured to compile a plurality of information including the subset of the stored information and provide the compiled plurality of information for access to each one of a plurality of user accounts that transmitted to the server the respective specific information of the plurality of information,
   wherein the compiled plurality of information including the subset of the stored information further includes a plurality of subsets of stored information acquired from the plurality of user accounts,
   wherein contents of the plurality of subsets of stored information are accessible via a target page that is configured to display the plurality of compiled information in a form of a plurality of links to a plurality of subpages that are each associated with a corresponding one of the plurality of subsets of stored information, and
   wherein the contents of the plurality of subsets of stored information are viewable by each one of the plurality of user accounts via the plurality of subpages that are accessible via the target page.

16. The non-transitory computer-readable storage medium according to claim 15, wherein the user account is the specific user account that initiates the operations for collecting information, and the operations further comprise:
   displaying the page for collecting the specific information with a trigger option to initiate the operations for collecting information from the members of the social group;
   detecting that the trigger option is selected; and
   generating the trigger message to be sent to the members of the social group.

17. The non-transitory computer-readable storage medium according to claim 16, wherein the operations further comprise:
   displaying a first setting interface page when the selection of the trigger option is detected;
   receiving an input of the prompt text via the first setting interface page;
   generating the trigger message based on the received prompt text and the jump instruction to the page for collecting the specific information; and
   causing the trigger message to be sent to the members of the social group.

18. The non-transitory computer-readable storage medium according to claim 16, wherein the operations further comprise:
   displaying a second setting interface page when the selection of the trigger option is detected, the second setting interface being used to receive the prompt text and a selection of the page from a plurality of pages;
   receiving an input of the prompt text via the second setting interface page;
   receiving the selection of the page from the plurality of pages via the second setting interface page;
   generating the jump instruction for jumping to the page;
   generating the trigger message based on the received prompt text and the generated jump instruction; and
   causing the trigger message to be sent to the members of the social group.

19. The non-transitory computer-readable storage medium according to claim 15, wherein the operation of displaying the text link on the interface page for the communication service comprises:
   highlighting the text link on the interface page.

20. The non-transitory computer-readable storage medium according to claim 15, wherein the operation of executing the jump instruction to display the page for collecting the specific information when the trigger event with respect to the text link is detected comprises:
   executing the jump instruction to display the page for collecting the specific information;
   receiving an input of the specific information via the page; and
   uploading the received specific information to the server for providing the communication service for the server to collect the specific information.

* * * * *